March 25, 1958 — C. E. HEIN — 2,827,992
ONE-WAY CLUTCH
Filed June 9, 1953
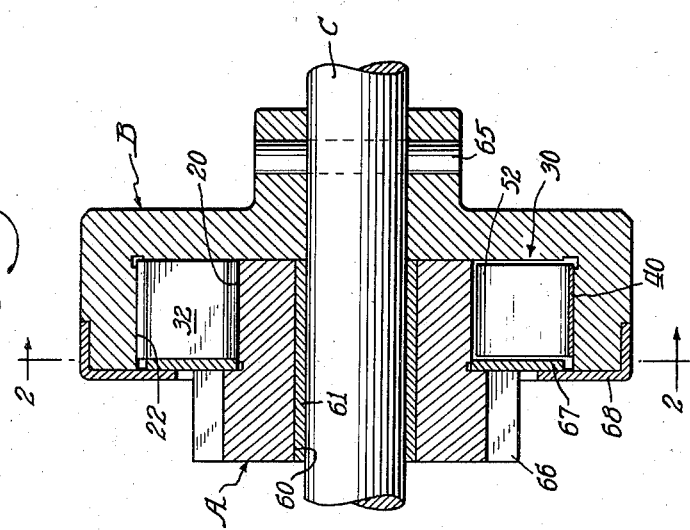
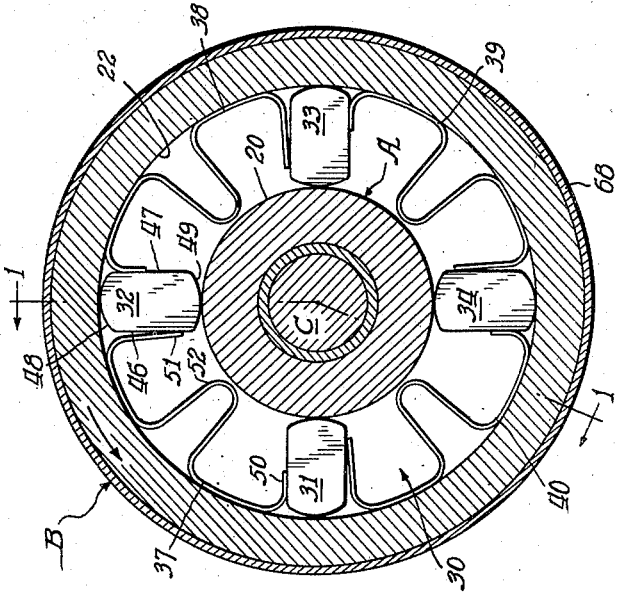
Inventor:
Charles E. Hein
By: Joseph M. Gartner
Atty.

United States Patent Office 2,827,992
Patented Mar. 25, 1958

2,827,992

ONE-WAY CLUTCH

Charles E. Hein, Detroit, Mich., assignor to Morse Chain Company, Ithaca, N. Y., a corporation of New York Application June 9, 1953, Serial No. 360,425

1 Claim. (Cl. 192—45.1)

This invention relates, in general, to clutches and is particularly concerned with clutches of the one-way type.

Otherwise stated, the invention is embodied in a one-way clutch of the type in which a series of sprags are arranged between drive and driven members. With such constructions relative rotation of the drive and driven members will be free in one direction, but in the reverse direction will cause instantaneous clutching by said sprags. It is, however, necessary that the sprags should have their end surfaces held in contact with the adjacent surfaces of the drive and driven members and with sufficient pressure to produce the necessary friction for instantaneous clutching action.

More specifically stated, it is a general object and accomplishment of the invention to provide a one-way clutch in which the sprags of the entire series are disposed in spaced relationship to each other and tensioned to hold the same in frictional engagement with the cooperating surfaces.

Another object of the invention is to provide a one-way clutch whereby a substantially uniform pressure against the sprags is effected to advantageously provide substantially uniform loading.

The invention seeks as another important object and accomplishment, to provide a one-way clutch such as contemplated herein and characterized by a novel combination of parts arranged and adapted to provide a compact assembly which will successfully combine the factors of structural simplicity, efficiency and durability, thereby to increase its versatility in use and yet be economical to manufacture.

The invention further contemplates the provision of a simply constructed one-way clutch that is capable of being made of small dimensions, that is made of few parts and that may be quickly assembled and which will operate instantaneously upon reversal of the rotation of the driving member.

An ancillary object and accomplishment of the invention is to provide a new and improved one-way clutch which is adapted to be economically manufactured and which is so designed as to permit the manufacture and assembly thereof in accordance with present day large scale mass production methods of construction and assembly.

Additional objects, features and advantages of the invention disclosed herein will be apparent to persons skilled in the art after the construction and operation are understood from the within description.

It is preferred to accomplish the various objects of this invention and to practice the same in substantially the manner as more fully described herein, and as more particularly pointed out in the appended claim.

Embodiments of the invention are illustrated in the accompanying drawing forming a part hereof and wherein:

Fig. 1 is a sectional view of a one-way clutch embodying the features of the present invention and being taken substantially on the plane of the line 1—1 in Fig. 2; and Fig. 2 is a sectional view of the one-way clutch depicted in Fig. 1 and being taken substantially on the plane of the line 2—2 in Fig. 1.

The drawing is to be understood as being more or less of a schematic character for the purpose of illustrating or disclosing a typical or preferred form of the improvements contemplated herein, and in the drawing like reference characters identify the same parts in the several views.

I have illustrated the present one-way clutch assembled in an operative position between a driven member which I have designated in its entirety by the letter A and a driving member which I have designated in its entirety by the letter B. It is important to note that in some applications it may be advantageous and preferable to have the driving and driven elements in reversed positions.

As shown, the driven member A is provided with a smooth, cylindrical surface 20 adapted to be employed as an inner race for the one-way clutch to be hereinafter described in detail. The driven member B is provided with a smooth cylindrical surface 22 concentrically arranged in spaced relationship with the race 20 and adapted to form an outer race for the one-way clutch.

It will be observed that the arrangement of the one-way clutch to be hereinafter described in detail is such as to effectively couple the driving and driven members in one direction of operation and to release these members when the direction of operation is reversed so that either the driving member or the driven member may be rotated independently of the other member.

Suffice it to say, since the invention is not particularly concerned with the precise construction of the driving and driven members, generally, they will not be further described in detail. It is to be understood that the details of construction of these members may be modified to suit particular conditions, and I do not wish to be limited to the precise details of construction of these elements as set forth.

Having thus described the general environment surrounding the one-way clutch in which the present invention is particularly concerned the specific construction and cooperating functions of the parts of the said one-way clutch will now be described in detail.

In general, it may be stated that it is extremely desirable in a one-way clutch of the type contemplated by this invention to have a sprag which may be cut to length without grooves or notches, thereby affording a substantial reduction in the cost of manufacture.

In the exemplary embodiment of the invention depicted in Figs. 1 and 2, the one-way clutch assembly is designated in its entirety by the numeral 30 and comprises, generally, a plurality of sprags 31, 32, 33 and 34 arranged in annularly spaced relationship between the driving and driven members with the respective tops and bottoms of the sprags being disposed in intimate engagement with the respective races 22 and 20 of the driving and driven members, and a plurality of spring members 37, 38, 39 and 40 alternatively disposed between said sprags and between the races 20 and 22 of the driving and driven members in a manner so that the end portions of one of said spring members is in intimate engagement with a sprag while the other end of the spring is in intimate engagement with another sprag.

Because each of the sprags is of identical construction, it is deemed sufficient to describe only one of them. In accordance with this invention, the sprags such as at 31 are prismatic in section having straight parallel sides 46 and 47 and a top 48 and a bottom 49, said top and bottom being formed on circular arcs struck about centers spaced widthwise of the sprags so that the diagonal length in one direction is greater than that in the other direction, thereby to cause the wedging angle to increase as the grip between the driving and driven members and the sprags tighten which will increase the torque capacity of the clutch.

It is notable that the sprags 31, 32, 33 and 34 normally lie at angles to radii struck through the center of the driven member as shown in Fig. 1 and when tilted in this position will permit clockwise rotation of the drive member B relative to the driven member A. If the driving member B should attempt to turn counterclockwise relative to the driven member A or if the driven member A should overrun the driving member B, the sprags will be caused to lock to a more nearly radial position and will bind the races 20 and 22 to hold the driven and the driving members against rotation with respect to each other.

Attention is invited to the top 48 and the bottom 49 of the sprags which engage the races 22 and 20 respectively in such a way that when the driving member B is rotated counterclockwise relative to the driven member A the sprags tend to rotate into a position in which they wedgingly engage the races to prevent relative rotation between the driven and driving members.

It is to be understood that the race of the driving member B will be free to rotate in a clockwise direction as noted above, but if the driven member A should tend to overrun the driving member B in a clockwise direction the engagement of the top 48 and the bottom 49 of the sprags with the respective races will tilt the sprags and force them into tight engagement with the races thereby locking the races against relative rotation.

It has been found particularly desirable to provide a uniform resilient pressure against the sprags, which will cause the proper seating thereof and hold them in their operative position. Moreover, it is desirable to provide movement of the sprags slightly at angles with respect to a line parallel to the axis of the driving and driven members to facilitate proper seating of the top and bottom surfaces of the sprags with their respective races.

This feature is advantageously accomplished in the present invention by the employment of the spring members 37, 38, 39 and 40 as shown. The resilient characteristics of the springs members will permit slight movement of the sprags at angles with respect to a line parallel to the axis of the driving and driven members, thereby facilitating the proper seating of the sprags with respect to the driving and driven members.

Moreover, the resilient characteristics of the spring member will hold the sprags in their operative position so that they will operate instantaneously upon reversal of the rotation of the driving member or if the driven member A should overrun the driving member B.

The present clutch may be made in comparatively small dimensions. Heretofore, with arrangements found in the prior art it was not practical to construct a clutch of small dimensions as found in the present invention and yet have the advantages found in the present invention.

It is notable that the sprags may be cut to length without grooves or notches disposed on the end portions thereof. The spring elements as contemplated by this invention eliminates the necessity of costly grooves and notches deemed conventional in the prior art.

Particular note should be taken of the shape of the spring member. For example, in the spring element 37 it can be seen that the end portions 50 thereof are in intimate engagement with radially outward regions of a side wall of the sprag 31 thereby to urge the radially outward regions of the sprag in a counterclockwise direction. The other end portions 51 of the spring 37 are in intimate engagement with the radial inward regions of the side wall of the sprag 32 thereby urging the radially inward regions of the sprag in a generally counterclockwise direction.

In order to provide softness to the spring action there is provided the center fold 52. Of course, in some adaptations where extreme softness is not desired this fold may be of smaller dimensions or may be eliminated entirely. In other adaptations it may be desirable to have more than one center fold such as indicated at 52. The purpose of the fold is to make the spring softer so that under variable space conditions, due to the locking condition of the sprag, the spring force does not change as rapidly. Increased spring force increases overrunning resistance.

It is notable that the width of the spring is substantially the width of the sprag and may be maintained in its proper position without necessitating a cage or extended sprag to accommodate a spring or springs.

Attention is invited to Figs. 1 and 2 wherein the driven member A is provided with a central through bore 60 having a bushing 61 adapted to receive a shaft C. It is notable that the driving member B is fixedly secured to the shaft C by means of the pin 65. The outer peripheral surface of the driven member A may be provided with either gear or sprocket teeth as at 66 for interengagement with other power transmission equipment (not shown).

The clutch assembly may be enclosed by means of the annular plate 67 held in proper position by means of an annular ring-like member 68 fitted to the driving member B as shown in Fig. 1.

It is particularly notable that the one-way clutch of the present invention is simple in construction and readily adaptable to mass production manufacturing methods of construction and assembly.

From the foregoing disclosure it can be seen that I have provided a one-way clutch which efficiently fulfills the objects hereinbefore set forth and provides numerous advantages which may be summarized as follows:

(1) Structurally simple, efficient and durable;
(2) Economical to manufacture and readily adaptable to mass production manufacturing;
(3) Capable of being made in small dimensions; and
(4) Quick acting.

While I have illustrated a preferred embodiment of my invention, many modifications may be made without departing from the spirit of the invention, and I do not wish to be limited to the precise details of construction set forth but desire to avail myself of all changes within the scope of the appended claim.

I claim:

In a one-way engaging device comprising means defining coaxially arranged, radially spaced inner and outer races, a plurality of non-circular sprags disposed in circumferential array between said races, each of said sprags having opposed generally radially extending plane surfaces, means defining a plurality of compression springs having terminal portions extending generally toward said inner race and disposed between successive sprags, said springs having portions adjacent said terminal portions lying adjacent said outer race and having an intermediate radially inwardly extending reverse bend for controlling the effective force thereof and the springs being and positioned so that the one portion of one spring engages a particular sprag at a radially outward region while the opposite terminal portion of another spring engages the opposite side of said particular sprag at a radially inward region thereof so as to cause said sprag to be biased about the transverse general axis thereof into race engaging relationship.

References Cited in the file of this patent

UNITED STATES PATENTS

| | | |
|---|---|---|
| 2,154,212 | Moorhouse | Apr. 11, 1939 |
| 2,408,962 | Swenson | Oct. 8, 1946 |
| 2,599,793 | Warner | June 10, 1952 |
| 2,630,896 | Dodge | Mar. 10, 1953 |
| 2,705,066 | Szady | Mar. 29, 1955 |

FOREIGN PATENTS

| | | |
|---|---|---|
| 298,673 | Great Britain | Oct. 15, 1928 |